United States Patent [19]

Sugasawa et al.

[11] Patent Number: 5,376,454
[45] Date of Patent: Dec. 27, 1994

[54] SURFACE COATING MEMBER

[75] Inventors: Takamasa Sugasawa, Odawara; Yoshiyuki Hirokawa, Hikone, both of Japan

[73] Assignees: Takata Corporation, Tokyo; SST Inc., Yokohama, both of Japan

[21] Appl. No.: 983,247

[22] Filed: Nov. 30, 1992

Related U.S. Application Data

[63] Continuation of Ser. No. 722,291, Jun. 27, 1991, abandoned.

[51] Int. Cl.$^5$ ............ B32B 27/00; C08K 3/04; C08K 3/16; C08L 27/12
[52] U.S. Cl. ............ 428/421; 15/250.36; 49/475; 52/717.04; 52/717.05; 296/93; 428/122; 428/327; 428/328; 428/331; 428/358; 428/408; 428/422; 524/544; 524/780; 524/783
[58] Field of Search ............ 15/250.36; 252/12.4; 384/909; 428/327, 328, 421, 422, 121, 122, 323, 331, 358, 408; 524/544, 780, 783; 52/397, 400, 713.03, 716.5, 716.8, 717.01, 717.04, 717.05; 277/235 A; 49/475; 296/93

[56] References Cited

U.S. PATENT DOCUMENTS

| | | | |
|---|---|---|---|
| 4,045,838 | 9/1977 | Porter | 15/250.36 |
| 4,103,385 | 8/1978 | Porter | 15/250.36 |
| 4,252,859 | 2/1981 | Concannon et al. | 428/422 |
| 4,616,060 | 10/1986 | Killgoar, Jr. | 15/250.36 |
| 4,622,712 | 11/1986 | Sugita et al. | 428/492 |
| 4,626,365 | 12/1986 | Mori | 252/12.4 |
| 4,655,944 | 4/1987 | Mori | 252/12.4 |
| 4,770,927 | 9/1988 | Effenberger et al. | 428/421 |
| 4,787,991 | 11/1988 | Morozumi et al. | 252/49.6 |
| 4,912,803 | 4/1990 | Yosukawa et al. | 428/408 |

FOREIGN PATENT DOCUMENTS

| | | |
|---|---|---|
| 0252669 | 1/1988 | European Pat. Off. |
| 0395130 | 10/1990 | European Pat. Off. |
| 1930505 | 12/1969 | Germany |
| 2928081 | 1/1981 | Germany |
| 19745 | 2/1977 | Japan |
| 18317 | 1/1985 | Japan |

OTHER PUBLICATIONS

Database WPIL/Week 8131, Derwent Publications Ltd., London, GB; AN 81-56069D & JP-A-56 072 058(Tokyo Slicon KK) Jun. 16, 1981.
Database EWPI/Week 7606, Derwent Publications Ltd., London, GB; AN 76-10785X & SU-A-466 133 (V. V. Berezovsky) Aug. 6, 1975.

*Primary Examiner*—D. S. Nakarani
*Attorney, Agent, or Firm*—Kanesaka & Takeuchi

[57] ABSTRACT

The present invention concerns a surface coating sliding member made of rubber or plastic applied with a coating of excellent durability and high sliding property, in which the coating contains a solid lubricant such as molybdenum disulfide and a resin matrix, wherein the resin matrix comprises a fluoro-olefin vinyl ether polymer resin and/or fluoro-olefin vinyl ether vinyl ester copolymer.

13 Claims, 1 Drawing Sheet

SURFACE COATING MEMBER

CROSS-REFERENCE TO RELATED APPLICATION

This application is a continuation of application Ser. No. 722,291 filed on Jun. 27, 1991, abandoned.

BACKGROUND OF THE INVENTION

1. Field of the Invention

The present invention concerns a surface coating member and, more in particular, it relates to a surface coating member prepared by applying a lubricating coating to tile surface of a rubber or plastic member such as wiper blade, seal packing, O-ring, weather strip, glass run, timing belt, rubber bellows, gear and door catcher. More in particular, the present invention relates to a surface coating member suitable as a surface-coated sliding member such as a wiper blade, glass run, weather strip and O-ring whose surface is in sliding contact with other members.

2. Description of the Prior Art

For a wiper blade rubber, a molding product of natural rubber or synthetic rubber has been employed so far. However, the wiper rubber of this kind has the following drawbacks and hence is not always satisfactory.

That is, since an adhering phenomenon occurs between the wiper blade rubber and a glass surface in the damp-drying state or under cold climate condition, to bring about a so-called "locking phenomenon" in which the wiper operation is blocked, or a so-called "trembling phenomenon", that is, self-exciting vibration due to the negative characteristics of the velocity dependency of tile frictional coefficient. This leads to problems such as (1) unsatisfactory wiping, (2) abnormal abrasion at the surface of the blade rubber, (3) shortening for the life in each of connection portions of the wiper system, (4) increase of power consumption for the operation motor and (5) eyesore and grating due to the trembling phenomenon.

For overcoming such problems, Japanese Patent Laid-Open Sho 55-15873 proposes to coat on the rubber surface of a wiper blade with a silicone composition containing molybdenum disulfide.

However, in the wiper blade rubber having such a coating as described in the above-mentioned patent publication, it has been found that the durability of the coating layer becomes poor. The problem also occurs in the weather strip or the glass run.

Further, the following drawbacks are also caused between the metal surface and the rubber material and the coating material not always has a satisfactory property.

That is, in an oil seal or gasoline cap seal, sticking occurs between the rubber and the metal surface to increase torque upon opening and closure. In an O-ring, packing or timing belt, there happens abnormal abrasion, stick slip or generation of ringing owing to high sliding resistance between the rubber and the metal surface. Also in rubber bellows, puncture occurs due to the abnormal abrasion. Further, in a gear or door catcher made of polyacetal, nylon resin, etc. abnormal abrasion, ringing or creaking occurs.

For overcoming the foregoing problems, although a countermeasure such as coating of grease has been applied, this lacks in durability.

OBJECT AND SUMMARY OF THE INVENTION

The object of the present invention is to overcome the foregoing problems and provide a surface coating member having excellent sliding property and also high durability of the coating layer.

The surface coating member according to the present invention comprises a surface coating member in which a coating layer containing a solid lubricant and a resin matrix is formed at the surface, in which the resin matrix comprises a fluoro-olefin vinyl ether polymer resin and/or a fluoro-olefln vinyl ether vinyl ester copolymer resin.

There is no particular restriction to rubber or plastic constituting the main body portion of the coating member according to the present invention but various kinds of rubber and plastic can be employed. The rubber may be either of natural or synthetic rubber. As an example of the synthetic rubber, there can be mentioned, for instance, styrene butadiene rubber, butaxdiene rubber, isoprene rubber, ethylene propylene rubber (EPM, EPDM), acrylonitrile butadiene rubber, chloroprene rubber, isobutylene isoprene rubber, alfin rubber, polyether rubber, polysulfide rubber, silicone rubber, acrylic rubber, fluoro rubber, halogenated polyethylene rubber, urethane rubber, ethylene vinyl acetate rubber, high styrene rubber and acrylonitrile isoprene rubber. Among them, IEPDM is particularly, preferred.

As the plastic material, either of a thermosetting resin or a thermoplastic resin may be used.

As an example of the plastic, there can be mentioned, for instance, ABS resin, ABS blend, acetal resin (homopolymer), acryl resin, ACS resin, alkyd resin, amino resin, ASA resin, cellulose type resin, chlorinated polyether, diallyl phthalate resin, epoxy resin, ethylene - vinyl acetate copolymer, fluoro resin, ionomer, methyl pentene polymer, phenol resin, polyamide (nylon), polyallyl ether, polyallyl sulfone, polybutene-1, polycarbonate, unsaturated polyester resin, polyethylene, polyethylene terephthalate (tetron), polyimlde, polyamidemide, polyphenylene oxide, polyphenylene sulfide, polypropylene, polystyrene, polysulfone, polyether sulfone, polyurethane, vinyl chloride resin and polyallylate.

The coating layer coating the rubber or plastic comprises a solid lubricant and a resin matrix.

As the resin matrix, a fluoro-olefin vinyl ether polymer resin and/or a fluoro-olefin vinyl ether vinyl ester copolymer resin may be used.

As the solid lubricant, there can be used, for example, sulfide such as molybdenum disulfide and tungsten disulfide, fluoride such as polytetrafluoro ethylene and fluorinated graphite, graphite and silicone powder. The solid lubricant described above may be used alone or as a combination of two or more of them. In the present invention, combined use of the sulfide, fluoro compound and graphite is preferred in view of the excellent lubrication resistance, fitness and feeling. In this case, the blending ratio for the sulfide, fluoro compound and graphite is preferably from 10 to 1500 parts by weight of the sulfide and 100 to 3000 parts by weight of the fluoro compound based on 100 parts by weight of the graphite.

It is desirable that the solid lubricant has an average grain size of less than 10 $\mu$m, preferably, less than 5 $\mu$m, particularly, preferably, less than 3 $\mu$m. The blending ratio of the solid lubricant and resin matrix is preferably from 50 to 95 parts by weight of the solid lubricant and 50 to 5 parts by weight of the resin matrix and, more preferably, from 70 to 90 parts by weight of the solid lubricant and 30 to 10 parts by weight of the resin matrix.

For forming the coating on the surface of the rubber or the plastic in the present invention, the solid lubricant, the resin matrix and a curing agent may be coated while being dispersed or dissolved in an organic solvent.

As the curing agent, there can be used, for example, polyisocyanate and melamine resin.

As the organic solvent, methyl ethyl ketone, toluene, xylene, isopropyl alcohol, isobutanol, n-butanol, butyl acetate, MIBK and cellosolve acetate are preferred, for example.

As the coating method, various method such as brushing, spraying or dipping may be employed. Prior to the coating, the surface of the rubber or plastic may be cleaned or a surface treatment may be applied for improving the fitness with the resin matrix. For the surface treatment, a primer treatment can be mentioned.

BRIEF DESCRIPTION OF THE ACCOMPANYING DRAWINGS

FIG. 1 is a schematic side elevational view for illustrating the method of experiment.

DESCRIPTION OF PREFERRED EMBODIMENTS

Figure 1:
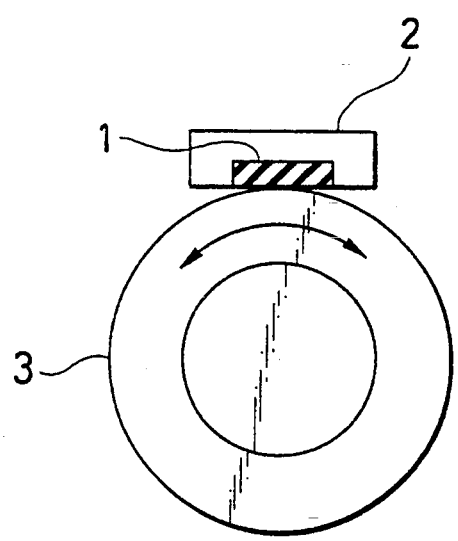

The present will now be explained with reference to examples and comparative examples.

Compositions shown in the following (Comparative Example 1) - (Comparative Example 4), as well as (Example 1) - (Example 9) were sprayed on the surface of rubber pieces, and the compositions were cured under the curing conditions (heating conditions) shown in each of them, to form a coating Layer at a thickness of 10 μm on the surface of each of the rubber pieces. Each rubber piece was cut into a size of 10 mm×6 mm×2 mm to prepare a test piece. The coating surface was formed on the 10 mm×6 mm surface of the test piece.

The test piece was mounted no FALEX No. 1 Tester (Faville-Levally Corporation) and the durability of the coating layer was examined.

FIG. 1 is a schematic side elevational view illustrating the state of the test, in which a test piece was held to a test piece holder 2 and urged to the outer circumferential surface of a ring 3 of 35 mm diameter under a load of 9.06 kg (20 LBS). The outer circumferential surface of the ring 3 was made of SAE 4620 steel and the surface roughness was 6–12 rms. The ring 3 was reciprocally rotated around the axial center as shown by arrows within a rotational range of 90° at a rate of 100 cycle/min.

The number of cycles at which tile frictional coefficient reached 0.2 was measured as a life cycle. In a case where the coating layer was abraded to expose the rubber layer before the frictional coefficient reached 0.2, the number of cycles up to that time was defined as the life cycle.

The life cycle for each off the comparative examples and the examples is shown in Table-1. The static frictional coefficient and the dynamic frictional coefficient at the surface of the coating layer for each of the test pieces before the sliding movement with the ring 3 were measured and the results are also shown together in Table-1.

From Table-1, it can be seen that the test pieces of Examples 1-9 according to the present invention have low friction coefficient and the durability of the coating layer was remarkably high.

The average grain size of the solid lubricant used hereinafter is less than 5 μm in each of the cases.

In the following descriptions, "parts" means "parts by weight".

(Comparative Example 1)

| | |
|---|---|
| (Polyurethane resin) Nipporan 5185 (manufactured by Nippon Polyurethane Industry co.) | 100 parts |
| (Isocyanate curing agent) Coronate HL | 10.0 parts |
| Curing conditions: 80° C. - 30 min. | |

(Comparative Example 2)

| | |
|---|---|
| (Polyurethane resin) Nipporan 5185 (manufactured by Nippon Polyurethane Industry co.) | 26.0 parts |
| (Molybdenum disulfide) Technical grade (manufactured by Climax Molybdenum Co.) | 30.0 parts |
| (Polytetrafluoroethylene) Lubron L-5 (manufactured by Daikin Industry Co.) | 42.0 parts |
| (Graphite) ACP 1000 (manufactured by Nippon Graphite Industry Co.) | 2.0 parts |
| (Isocyanate curing agent) Coronate HL | 2.6 parts |
| Curing conditions: 80° C. - 30 min. | |

(Comparative Example 3) (corresponding to Example 3 in Japanese Patent Laid-Open Sho 55-15873)

| | |
|---|---|
| KM-765 (Emulsion with 20% silicone content) (manufactured by Juetsu Chemical Co.) | 45 parts |
| C-PM-4F (catalyst, manufactured by Juetsu Chemical Co.) | 4.5 parts |
| Molybdenum disulfide (4.5 μm average grain size) | 4.0 parts |
| Water | 52.0 parts |
| Curing condition: After leaving at a room temperature for 10 min, a cured layer was obtained at 150° C. - 10 min | |

(Comparative Example 4)

| | |
|---|---|
| (Fluoro-olefin vinyl ether vinyl ester copolymer) Fluonate K702 (manufactured by Dainippon Ink Chemical Industry Co.) | 100 parts |
| (Isocyanate curing agent) Barnock DN980 (manufactured by Dainippon Ink Chemical Industry Co.) | 24 parts |
| Curing condition: 80° C. - 10 min. | |

(Example 1)

| | |
|---|---|
| (Fluoro-olefin vinyl ether vinyl ester copolymer) Fluonate K702 (manufactured by Dainippon Ink Chemical Industry Co.) | 26 parts |
| (Molybdenum disulfide) Technical grade (manufactured by Climax Molybdenum Co.) | 30 parts |
| (Polytetrafluoro ethylene) Lubron L-5 (manufactured by Daikin Industry Co.) | 42 parts |
| (Graphite) ACP 1000 (manufactured by Nippon Graphite Industry Co.) | 2 parts |
| (Isocyanate curing agent) Barnock DN980 (Dainippon Ink Chemical Industry Co.) | 6.2 parts |
| Curing condition: 80° C. - 10 min. | |

(Example 2)

| (Fluoro-olefin vinyl ether vinyl ester copolymer) Fluonate K702 (manufactured by Dainippon Ink Chemical Industry Co.) | 28 parts |
|---|---|
| (Molybdenum disulfide) Technical grade (manufactured by Climax Molybdenum Co.) | 10 parts |
| (Polytetrafluoro ethylene) Lubron L-5 (manufactured by Daikin Industry Co.) | 60 parts |
| (Graphite) ACP 1000 (manufactured by Nippon Graphite Industry Co.) | 2 parts |
| (Isocyanate curing agent) Barnock DN980 (Dainippon Ink Chemical Industry Co.) | 6.7 parts |
| Curing condition: 80° C. - 10 min. | |

(Example 3)

| (Fluoro-olefin vinyl ether vinyl ester copolymer) Fluonate K702 (manufactured by Dainippon Ink Chemical Industry Co.) | 28 parts |
|---|---|
| (Molybdenum disulfide) Technical grade (manufactured by Climax Molybdenum Co.) | 47 parts |
| (Polytetrafluoro ethylene) Lubron L-5 (manufactured by Daikin Industry Co.) | 23 parts |
| (Graphite) ACP 1000 (manufactured by Nippon Graphite Industry Co.) | 2 parts |
| (Isocyanate curing agent) Barnock DN980 (Dainippon Ink Chemical Industry Co.) | 6.7 parts |
| Curing condition: 80° C. - 10 min. | |

(Example 4)

| (Fluoro-olefin vinyl ether vinyl ester copolymer) Fluonate K702 (manufactured by Dainippon Ink Chemical Industry Co.) | 49 parts |
|---|---|
| (Molybdenum disulfide) Technical grade | 39 parts |
| (Polytetrafluoro ethylene) Lubron L-5 | 10 parts |
| (Graphite) ACP 1000 | 2 parts |
| (Isocyanate curing agent) Barnock DN980 | 6.7 parts |
| Curing condition: 80° C. - 10 min. | |

(Example 5)

| (Fluoro-olefin vinyl ether vinyl ester copolymer) Fluonate K702 | 49 parts |
|---|---|
| (Molybdenum disulfide) Technical grade | 47 parts |
| (Polytetrafluoro ethylene) Lubron L-5 | 2.5 parts |
| (Graphite) ACP 1000 | 1.5 parts |
| (Isocyanate curing agent) Barnock DN980 | 12.0 parts |
| Curing condition: 80° C. - 10 min. | |

(Example 6)

| (Fluoro-olefin vinyl ether vinyl ester copolymer) Fluonate K702 | 49 parts |
|---|---|
| (Molybdenum disulfide) Technical grade | 49 parts |
| (Graphite) ACP 1000 | 2 parts |
| (Isocyanate curing agent) Barnock DN980 | 12 parts |
| Curing condition: 80° C. - 10 min. | |

(Example 7)

| (Fluoro-olefin vinyl ether vinyl ester copolymer) Fluonate K702 | 39 parts |
|---|---|
| (Molybdenum disulfide) Technical grade | 59 parts |
| (Graphite) ACP 1000 | 2 parts |
| (Isocyanate curing agent) Barnock DN980 | 9.4 parts |
| Curing condition: 80° C. - 10 min. | |

(Example 8)

| (Fluoro-olefin vinyl ether vinyl ester copolymer) Fluonate K702 | 28 parts |
|---|---|
| (Molybdenum disulfide) Technical grade | 70 parts |
| (Graphite) ACP 1000 | 2 parts |
| (Isocyanate curing agent) Barnock DN980 | 6.7 parts |
| Curing condition: 80° C. - 10 min. | |

(Example 9)

| (Fluoro-olefin vinyl ether vinyl ester copolymer) Fluonate K702 | 20 parts |
|---|---|
| (Molybdenum disulfide) Technical grade | 78 parts |
| (Graphite) ACP 1000 | 2 parts |
| (Isocyanate curing agent) Barnock DN980 | 4.8 parts |
| Curing condition: 80° C. - 10 min. | |

TABLE 1

| | Comp. Example 1 | Comp. Example 2 | Comp. Example 3 | Comp. Example 4 | Example 1 | Example 2 | Example 3 | Example 4 | Example 5 | Example 6 | Example 7 | Example 8 | Example 9 |
|---|---|---|---|---|---|---|---|---|---|---|---|---|---|
| Static frictional coefficient ($\mu o$) | 0.7 | 0.25 | 0.13 | 0.23 | 0.10 | 0.09 | 0.10 | 0.13 | 0.13 | 0.14 | 0.1 | 0.1 | 0.09 |
| dynamic frictional coefficient ($\mu$) | 0.5 | 0.35 | 0.18 | 0.38 | 0.14 | 0.16 | 0.15 | 0.17 | 0.17 | 0.17 | 0.16 | 0.16 | 0.14 |
| Endurance life (sliding cycles) | 10 | 200 | 1000 | 100 | 45000 | 42000 | 44000 | 33000 | 35000 | 35000 | 37000 | 37000 | 39000 |

As has been described above, the surface coating member according to the, present invention has an extremely low friction coefficient For the coating surface and the durability of the coating layer is remarkably high.

What is claimed is:

1. A surface coating member, comprising,
   means for forming a coating layer, said means containing 70 to 90 parts by weight of a solid lubricant formed of at least one member selected from the group consisting of molybdenum disulfide, tungsten disulfide, polytetrafluoro ethylene, fluorinated graphite, graphite and silicone powder, and 30 to 10 parts by weight of a thermosetting resin matrix, said resin matrix consisting of at least one member selected from the group consisting of fluoro-olefin vinyl ether polymer resin and fluoro-olefin vinyl ether vinyl ester copolymer resin, a curing agent selected from the group consisting of polyisocyanate and melamine resin, and an organic solvent for suspending or dissolving the solid lubricant, the resin matrix and the curing agent, said coating layer being formed on a surface of material such that after the solid lubricant and the thermosetting resin matrix together with the organic solvent are coated onto the surface of the material, said thermosetting resin matrix is cured at a temperature not to deteriorate said material, said coating layer having static frictional coefficient under 0.14 and dynamic frictional coefficient under 0.17, and a life cycle that the frictional coefficient of the coating layer reaches 0.2, Said life cycle being at least 33,000 sliding cycles, when the coating layer held by a holder is urged on a circular surface of a steel ring under a load of 9.06 kg, said steel ring having a surface roughness of 6–12 rms and being rotated back and forth within a rotational range of 90° at a rate of 100 cycle/min.

2. A surface coating member as defined in claim 1 wherein the solid lubricant comprises 10 to 1500 parts by weight of the molybdenum disulfide or the tungsten disulfide and 100 to 3000 parts by weight of the polytetrafluoro ethylene based on 100 parts by weight of graphite.

3. A surface coating member as defined in claim 2, wherein the surface coating member is applied to a wiper blade rubber.

4. A surface coating member as defined in claim 1 wherein the average grain size of the solid lubricant less than 10 μm.

5. A surface coating member as defined in claim 4, wherein the surface coating member is applied to a wiper blade rubber.

6. A surface coating member as defined in claim 1 wherein the average grain size of the solid lubricant is less than 5 μm.

7. A surface coating member as defined in claim 1 wherein the average grain size of the solid lubricant is less than 3 μm.

8. A surface coating member as defined in claim 1, wherein the surface coating member is applied to a wiper blade rubber.

9. A surface coating member as defined in claim 1, wherein the surface coating member is applied to a glass run.

10. A surface coating member as defined in claim 1, wherein the surface coating member is applied to a seal packing.

11. A surface coating member as defined in claim 1, wherein the surface coating member is applied to a weather strip.

12. A surface coating member as defined in claim 1, wherein the resin matrix is fluoro-olefin vinyl ether vinyl ester copolymer, 13. A surface coating member as defined in claim 1, wherein said life cycle is between 33,000 and 45,000 sliding cycles.

* * * * *